United States Patent
Ishizuka et al.

(10) Patent No.: US 9,982,129 B2
(45) Date of Patent: May 29, 2018

(54) POLYCARBONATE RESIN COMPOSITION, AND OPTICAL MATERIAL AND OPTICAL LENS EACH MANUFACTURED USING SAME

(71) Applicant: MITSUBISHI GAS CHEMICAL COMPANY, INC., Tokyo (JP)

(72) Inventors: Hirohito Ishizuka, Ibaraki (JP); Noriyuki Kato, Tokyo (JP); Kentaro Ishihara, Tokyo (JP); Munenori Shiratake, Tokyo (JP); Manabu Hirakawa, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 24 days.

(21) Appl. No.: 15/305,895

(22) PCT Filed: Apr. 28, 2015

(86) PCT No.: PCT/JP2015/062842
§ 371 (c)(1),
(2) Date: Oct. 21, 2016

(87) PCT Pub. No.: WO2015/166951
PCT Pub. Date: Nov. 5, 2015

(65) Prior Publication Data
US 2017/0051146 A1    Feb. 23, 2017

(30) Foreign Application Priority Data
May 2, 2014   (JP) .................. 2014-095320

(51) Int. Cl.
*C08L 69/00* (2006.01)
*C08G 64/06* (2006.01)
*G02B 1/04* (2006.01)

(52) U.S. Cl.
CPC .............. *C08L 69/00* (2013.01); *C08G 64/06* (2013.01); *G02B 1/04* (2013.01); *G02B 1/041* (2013.01); *C08L 2201/10* (2013.01); *C08L 2205/025* (2013.01)

(58) Field of Classification Search
CPC ...................................................... C08L 69/00
See application file for complete search history.

(56) References Cited

U.S. PATENT DOCUMENTS

| | | |
|---|---|---|
| 8,013,106 B2 | 9/2011 | Kato et al. |
| 9,360,593 B2 | 6/2016 | Ishizuka et al. |
| 2010/0048855 A1 | 2/2010 | Kato et al. |

(Continued)

FOREIGN PATENT DOCUMENTS

| | | |
|---|---|---|
| EP | 2 308 928 | 4/2011 |
| JP | 6-25398 | 2/1994 |

(Continued)

OTHER PUBLICATIONS

Toshikazu Takata et al., "Synthesis and Anionic Ring-Opening Polymerization of a Novel Aromaric Cyclic Carbonate Having Binaphthyl Structre", Chemistry Letters, vol. 20, No. 12; XP055427899, Dec. 1991, pp. 2091-2094.

(Continued)

*Primary Examiner* — David J Buttner
(74) *Attorney, Agent, or Firm* — Greenblum & Bernstein, P.L.C.

(57) ABSTRACT

A polycarbonate resin composition including: a polycarbonate resin (A) which has a constitutional unit (a) represented by general formula (4); and a polycarbonate resin (B) which has a constitutional unit (b) represented by general formula (5). (In formula (4), X represents an alkylene group having 1 to 4 carbon atoms.) (In formula (5), $R^1$ and $R^2$ independently represent a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms, or an aryloxy group having 6 to 20 carbon atoms; and Y represents an alkylene group having 1 to 4 carbon atoms.)

[Chemical Formula 4]

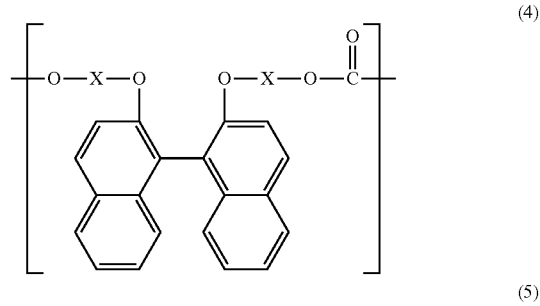

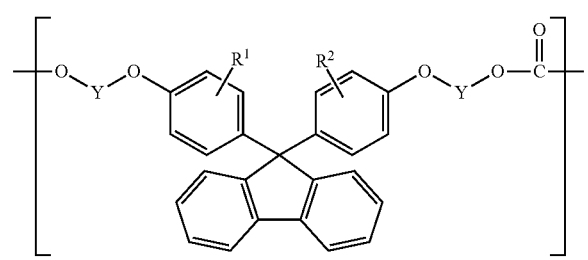

15 Claims, No Drawings

(56) References Cited

U.S. PATENT DOCUMENTS

| | | | |
|---|---|---|---|
| 2011/0201762 A1* | 8/2011 | Kato | ............... C08G 64/0208 525/462 |
| 2012/0095139 A1 | 4/2012 | Yoshida et al. | |

FOREIGN PATENT DOCUMENTS

| | | |
|---|---|---|
| JP | 2000-302857 | 10/2000 |
| JP | 2000-302858 | 10/2000 |
| JP | 2001-72872 | 3/2001 |
| JP | 2002-332345 | 11/2002 |
| JP | 2007-057916 | 3/2007 |
| JP | 2008-111047 A | 5/2008 |
| JP | 2010-132782 | 6/2010 |
| JP | 2010-248445 | 11/2010 |
| WO | 2007/142149 | 12/2007 |
| WO | 2014/073496 | 5/2014 |

OTHER PUBLICATIONS

Toshikazu Takata et al., "Synthesis and Polymerization of Cyclic Carbonates Containting a Binaphthyl Moiety", Japanese Journal of Polymer Science and Technology, vol. 54, No. 12, Dec. 1997, pp. 974-981.

Toshikazu Takata et al., "Optically Active Pol (aryl carbonates) Consisting of Axially Chiral Units. Chiral Binaphthyl Group Induced Helical Polymer", Journal of American Chemical Socity, vol. 120, Apr. 1998, pp. 4530-4531.

International Search Report issued in Patent Application No. PCT/JP2015/062842, dated Jun. 2, 2015.

\* cited by examiner

POLYCARBONATE RESIN COMPOSITION, AND OPTICAL MATERIAL AND OPTICAL LENS EACH MANUFACTURED USING SAME

TECHNICAL FIELD

The present invention relates to a polycarbonate resin composition and an optical molded body made of the same. More particularly, the present invention relates to a polycarbonate resin composition having high refractive index and transparency and low optical distortion, and an optical material and an optical lens using the same.

BACKGROUND ART

Optical lenses are not only used as spectacles, but also used in a variety of situations, for example, as optical systems of various cameras such as cameras, film-integrated cameras and video cameras. Examples of important physical properties as such lens materials include a refractive index (nD) and an Abbe's number (ν). For optical design of an optical unit, use of a material with a high refractive index can realize a lens element that has a surface with a smaller curvature, which has advantages of decreasing aberration caused on this surface, decreasing the number of lenses, reducing eccentric sensitivity of the lens, and allowing reduction of size and weight of the lens system by decreasing the lens thickness.

Moreover, for optical design of an optical unit, combinational use of multiple lenses having different Abbe's numbers from each other is known to correct chromatic aberration. For example, a lens made of an alicyclic polyolefin resin having an Abbe's number ν of 45-60 and a lens made of a polycarbonate (nD=1.586, ν=30) resin composed of bisphenol A having a low Abbe's number can be combined to correct chromatic aberration.

As lens materials, optical glass and optical transparent resins are widely used. Optical transparent resins have advantages in that they allow production of aspherical lenses by injection molding and in that they allow mass production. Injection molding is a technique in which plastic is softened by heating, forced with injection pressure to fill in a mold to be molded, and then the molded body is taken out after cooling the resin.

Although the fluidity of the resin can be further enhanced by increasing the temperature for softening the resin, there is restriction on the softening temperature because of tendency of decomposition and coloring of the resin. In addition, while the mold temperature is kept constant in most molding machines, the upper limit of the mold temperature is limited to about 150° C. since pressurized water is used as a heat medium in a general mold temperature regulating machine. Accordingly, if such machine is used to produce a product with high surface accuracy, the upper limit of the glass-transition temperature of the resin that can be used is as high as about 160° C.

While a polycarbonate resin made of bisphenol A has been is widely used for optical lens applications, further enhancement of the refractive index of optical lenses is required due to expansion of the applications of optical lenses. Moreover, application of a polycarbonate resin made of bisphenol A has been limited because of the weakness of large birefringence. Therefore, development of an optical lens resin that has both high refractive index and low birefringence has extensively been conducted.

In order to enhance physical properties of a bisphenol A-type polycarbonate resin, copolymerization with other type of polycarbonate resin has been conducted. In particular, Patent Document 1 discloses that copolymerization with a structural unit represented by Formula (1) enhances the refractive index.

[Chemical Formula 1]

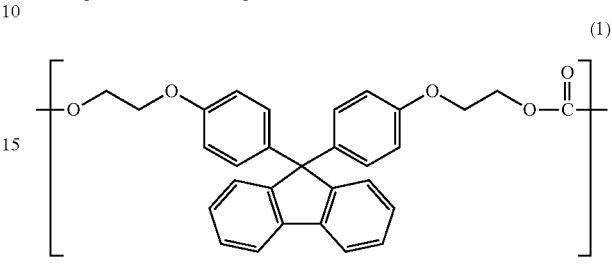

Patent Document 2 discloses a copolymer of a polycarbonate resin containing a structural unit having a fluorene structure and bisphenol A. The structural unit disclosed in this document is different from the structural unit represented by Formula (1).

Furthermore, as resins having a high refractive index, Patent Document 3 discloses copolymers in which bisphenol A-type polycarbonate or an aromatic polycarbonate resin is replaced with Formula (2). It is, however, described that although such resin composition has a higher refractive index, its glass-transition point exceeds 160° C.

[Chemical Formula 2]

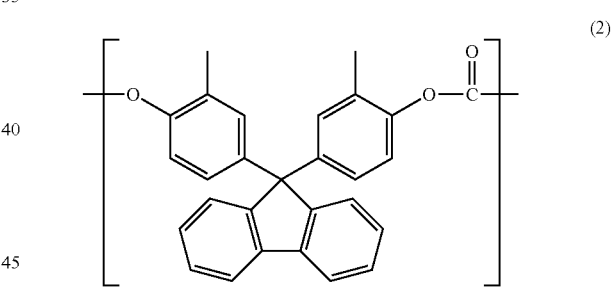

Next, birefringence will be described. While polycarbonate resins made of bisphenol A are widely used for optical lens application, there is a limit to its application because of the weakness of large birefringence. In particular, in recent applications to cell-phone cameras and digital cameras, a camera lens with high imaging performance and lower birefringence has been required along with the increase in the resolution owing to increased number of pixels.

An example of a method for realizing low birefringence of a resin material includes a technique in which compositions having positive and negative birefringences, i.e., opposite signs, are used to cancel birefringences of each other (Patent Document 1). The positive or negative sign of birefringence is determined by difference between the polarizability in the polymer main chain direction and the polarizability in the polymer side chain direction. For example, a polycarbonate resin made of bisphenol A in which polarizability in the polymer main chain direction is greater than the polarizability in the polymer side chain direction has positive birefringence whereas a polycarbonate resin made of bisphenol having a fluorene structure whose polarizability in the polymer side chain direction is greater than the polarizability in the polymer main chain direction has negative birefringence. Therefore, low refractive index has been realized with a copolymer having a combination of structural units with such opposite signs of birefringences.

Meanwhile, polymers having a 1,1'-binaphthalene structure are described in Patent Documents 4-7. Specifically, Patent Documents 4 and 5 disclose polycarbonate resins having a 1,1'-binaphthalene structure, which do not have a structural unit represented by Formula (3) below. Patent Documents 6 and 7 describe polymers containing a structural unit represented by Formula (3) but they are polyester carbonate resins and not polycarbonate resins.

[Chemical Formula 3]

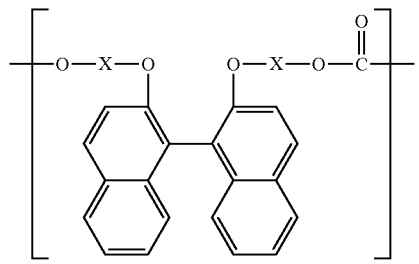

(3)

(in Formula (3), X represents an alkylene group with a carbon number of 1-4).

As describe above, a polycarbonate resin composition and an optical molded body that have a high refractive index and fluidity suitable for molding, that show low birefringence and that hardly cause optical distortion have not yet been provided.

PRIOR ART DOCUMENTS

Patent Documents

[Patent Document 1] WO2007/142149
[Patent Document 2] Japanese Unexamined Patent Application Publication No. Heisei 6-25398
[Patent Document 3] Japanese Unexamined Patent Application Publication No. 2010-132782
[Patent Document 4] Japanese Unexamined Patent Application Publication No. 2000-302857
[Patent Document 5] Japanese Unexamined Patent Application Publication No. 2000-302858
[Patent Document 6] Japanese Unexamined Patent Application Publication No. 2001-72872
[Patent Document 7] Japanese Unexamined Patent Application Publication No. 2002-332345

SUMMARY OF THE INVENTION

Problem to be Solved by the Invention

The problem to be solved by the present invention is to provide a polycarbonate resin composition that has a high refractive index and fluidity suitable for molding, that shows low birefringence and that hardly causes optical distortion.

Means for Solving the Problems

In order to solve the above-described problem, the present inventors have gone through keen studies and found that this problem can be solved with a polycarbonate resin composition comprising a polycarbonate resin (A) having a structural unit represented by General Formula (4), and a polycarbonate resin (B) having a structural unit represented by General Formula (5), thereby accomplishing the present invention. Thus, the present invention is as follows.

<1> A polycarbonate resin composition comprising a polycarbonate resin (A) having a structural unit (a) represented by General Formula (4), and a polycarbonate resin (B) having a structural unit (b) represented by General Formula (5)

[Chemical Formula 4]

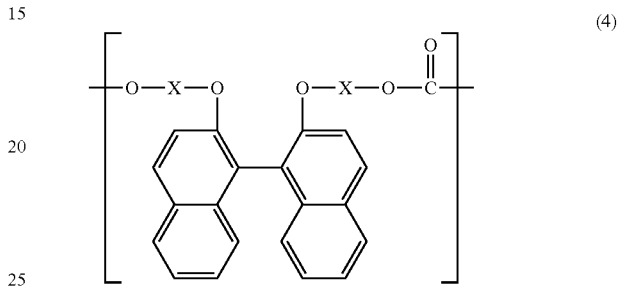

(4)

(in Formula (4), X represents an alkylene group with a carbon number of 1-4)

[Chemical Formula 5]

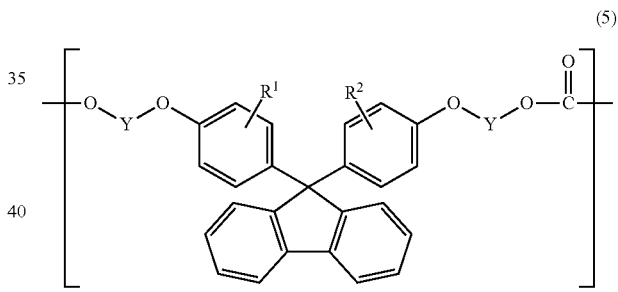

(5)

(in Formula (5), $R^1$ and $R^2$ each independently represent a hydrogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20 or an aryloxy group with a carbon number of 6-20, and Y represents an alkylene group with a carbon number of 1-4).

<2> The polycarbonate resin composition according to <1>, wherein the proportion of a structural unit other than the structural unit (a) in the polycarbonate resin (A) a) is 20 mol % or less with respect to the structural unit (a).

<3> The polycarbonate resin composition according to either one of <1> and <2>, wherein the proportion of a structural unit other than the structural unit (b) in the polycarbonate resin (B) is 20 mol % or less with respect to the structural unit (b).

<4> The polycarbonate resin composition according to any one of <1> to <3>, wherein the mass ratio (A:B) of the polycarbonate resin (A) and the polycarbonate resin (B) is 25:75-90:10.

<5> The polycarbonate resin composition according to any one of <1> to <4>, wherein the polycarbonate resin (A)

comprises a homopolymer consisting of the structural unit (a) and the polycarbonate resin (B) comprises a homopolymer consisting of the structural unit (b).

<6> The polycarbonate resin composition according to <5>, wherein the polycarbonate resin (A) consists of a homopolymer consisting of the structural unit (a) and the polycarbonate resin (B) consists of a homopolymer consisting of the structural unit (b).

<7> The polycarbonate resin composition according to any one of <1> to <6>, wherein X is an ethylene group.

<8> The polycarbonate resin composition according to any one of <1> to <7>, wherein $R^1$ and $R^2$ are hydrogen atoms.

<9> The polycarbonate resin composition according to any one of <1> to <8>, wherein the average molecular weight (Mw) of the polycarbonate resin (A) in terms of polystyrene is 20,000-300,000, and the average molecular weight (Mw) of the polycarbonate resin (B) in terms of polystyrene is 15,000-250,000.

<10> The polycarbonate resin composition according to any one of <1> to <9>, wherein the glass-transition point (Tg) is 95° C.-180° C.

<11> A molded body produced from the polycarbonate resin composition according to any one of <1> to <10>.

<12> The molded body according to <11>, wherein the refractive index is 1.640-1.680.

<13> The molded body according to <11>, wherein the Abbe's number is 24 or lower.

<14> An optical material that uses the molded body according to any one of <11> to <13>.

<15> An optical lens that uses the molded body according to any one of <11> to <13>.

Effect of the Invention

A polycarbonate resin composition of the present invention has a high refractive index, a low Abbe's number, high transparency and a high glass-transition temperature (heat resistance), and also shows low birefringence. By using such resin as a raw material, an excellent high-refractive-index optical lens with substantially no optical distortion can be obtained. Furthermore, an optical lens of the present invention can be produced by injection molding, and is highly productive and inexpensive.

MODES FOR CARRYING OUT THE INVENTION

<Polycarbonate Resin (A)>

A polycarbonate resin (A) comprises a structural unit (a) represented by General Formula (4). Specifically, a polycarbonate resin (A) is composed of a polymer comprising a structural unit (a) represented by General Formula (4). The polycarbonate resin (A) may comprise the structural unit represented by General Formula (4) alone or two or more types of them in combination.

Although a repeating structural unit of the polycarbonate resin (A) may comprise a structural unit other than the structural unit (a) represented by General Formula (4), the proportion of the structural unit other than the structural unit (a) is preferably 20 mol % or less, more preferably 10 mol % or less and still more preferably 0 mol %, with respect to 100 mol % of the structural unit (a) represented by General Formula (4). Within such range, a high refractive index can be retained. Particularly preferably, the polycarbonate resin (A) consists of a homopolymer consisting of a structural unit represented by General Formula (4).

According to the present invention, all of the junctions between the monomer units in the polycarbonate resin (A) consist of a carbonate bond (—O—(C═O)—O—). Hence, a polyester carbonate resin that has an ester bond (—(C═O)—O—) in addition to the carbonate bond is not included in the polycarbonate resin (A) of the present invention. Since the polycarbonate resin (A) does not have a hydrolyzable ester bond, it is capable of achieving lower water absorption and lower birefringence over a polyester carbonate resin.

An average molecular weight Mw of the polycarbonate resin (A) in terms of polystyrene is preferably 20,000-300,000, more preferably 20,000-200,000, still more preferably 25,000-120,000, and particularly preferably 25,000-50,000. If Mw is less than 20,000, the resin becomes brittle, which is unfavorable. If Mw exceeds 300,000, melt viscosity becomes high such that the produced resin is difficult to be taken out, and moreover fluidity will be poor such that handling in the molten state would be difficult, which are unfavorable.

<Method for Producing Polycarbonate Resin (A)>

A method for producing a polycarbonate resin (A) will be described.

The method for producing a polycarbonate resin (A) is not particularly limited. For example, a dihydroxy compound represented by General Formula (6) can be produced by a melt polycondensation method in the presence of diester carbonate and a catalyst. As a catalyst, a basic compound catalyst, a transesterification catalyst or a mixed catalyst made from both of them can be used.

[Chemical Formula 6]

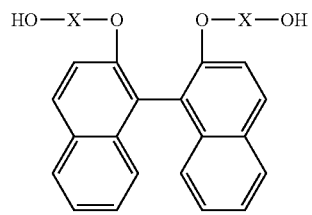

(in Formula (6), X represents an alkylene group with a carbon number of 1-4).

Examples of a dihydroxy compound represented by Formula (6) include 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene, and 2,2'-bis(4-hydroxybutoxy)-1,1'-binaphthalene. Such dihydroxy compounds are preferable since they can be melt-polymerized through a general production process. In general, the larger the carbon number of X in Formula (6) becomes, the smaller the melt viscosity becomes, by which toughness and moldability may be enhanced. Therefore, a compound represented by Formula (6) where X is an alkylene group with a carbon number of 2 or more, is more preferable in terms of excellent toughness and molding easiness. On the other hand, the larger the carbon number of X becomes, the lower the glass-transition temperature becomes, and thus a compound represented by Formula (6) where X is an alkylene group with a carbon number of 3 or less, is more preferable in terms of heat resistance. In order to achieve both excellent molding easiness and heat resistance, a compound represented by Formula (6) where X has a carbon number of 2-3 is still more preferable. In terms of excellent refractive index, monomer production and distribution, a compound represented by Formula (6) where X is an ethylene group with a carbon number of 2, i.e., 2,2'-bis(2-hydroxyethoxy)-1,1'-binaphthalene, is particularly preferable, in which case the polycarbonate resin (A) comprises a structural unit represented by General Formula (4) above where X represents an ethylene group. These compounds may be used alone or two or more types of them may be used in combination.

The polycarbonate resin (A) of the present invention may comprise a structural unit derived from a dihydroxy compound other than the dihydroxy compound represented by General Formula (6). Examples of such other dihydroxy compound include aliphatic dihydroxy compounds such as ethylene glycol, 1,3-propanediol, 1,2-propanediol, 1,4-butanediol, 1,3-butanediol, 1,2-butanediol, 1,5-heptanediol and 1,6-hexanediol, alicyclic dihydroxy compounds such as 1,2-cyclohexane dimethanol, 1,3-cyclohexane dimethanol, 1,4-cyclohexane dimethanol, tricyclodecane dimethanol, pentacyclopentadecane dimethanol, 2,6-decalin dimethanol, 1,5-decalin dimethanol, 2,3-decalin dimethanol, 2,3-norbornane dimethanol, 2,5-norbornane dimethanol and 1,3-adamantane dimethanol, and aromatic bisphenols such as 2,2-bis(4-hydroxyphenyl)propane [=bisphenol A], 2,2-bis(4-hydroxy-3,5-dimethylphenyl) propane, 2,2-bis(4-hydroxy-3,5-diethylphenyl)propane, 2,2-bis(4-hydroxy-(3,5-diphenyl) phenyl)propane, 2,2-bis(4-hydroxy-3,5-dibromophenyl)propane, 2,2-bis(4-hydroxyphenyl) pentane, 2,4'-dihydroxy-diphenylmethane, bis(4-hydroxyphenyl) methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxy diphenylsulfone, bis(4-hydroxyphenyl)sulfide, 4,4'-dihydroxy diphenylether, 4,4'-dihydroxy-3,3'-dichlorodiphenylether, 9,9-bis(4-hydroxyphenyl) fluorene and 9,9-bis(4-hydroxy-2-methylphenyl)fluorene.

Here, such other dihydroxy compound is preferably 20 mol % or less and more preferably 10 mol % or less with respect to 100 mol % of the dihydroxy compound represented by General Formula (6). Within this range, a high refractive index can be retained.

Examples of the diester carbonate include diphenyl carbonate, ditolyl carbonate, bis(chlorophenyl) carbonate, m-cresyl carbonate, dimethyl carbonate, diethyl carbonate, dibutyl carbonate and dicyclohexyl carbonate. Among them, diphenyl carbonate is particularly preferable. Diphenyl carbonate is used preferably at a ratio of 0.90-1.15 moles, and more preferably at a ratio of 0.95-1.10 moles with respect to 1 mole of the dihydroxy compound.

Examples of the basic compound catalyst particularly include alkali metal compounds and/or alkaline-earth metal compounds, and nitrogen-containing compounds.

Examples of the alkali metal compounds include organic acid salts, inorganic salts, oxides, hydroxides, hydrides and alkoxides of alkali metals. Specifically, sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate cesium benzoate, lithium benzoate, disodium hydrogen phosphate, dipotassium hydrogen phosphate, dilithium hydrogen phosphate, disodium phenyl phosphate, a disodium salt, dipotassium salt, dicesium salt or dilithium salt of bisphenol A, a sodium salt, potassium salt, cesium salt or lithium salt of phenol, or the like can be used. Among them, sodium hydrogen carbonate is preferable.

Examples of the alkaline-earth metal compound include organic acid salts, inorganic salts, oxides, hydroxides, hydrides and alkoxides of alkaline-earth metal compounds. Specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenylphosphate or the like can be used.

Examples of the nitrogen-containing compound include quaternary ammonium hydroxides and salts and amines thereof. Specifically, a quaternary ammonium hydroxide having an alkyl group, an aryl group or the like such as tetramethylammonium hydroxide, tetraethylammonium hydroxide, tetrapropylammonium hydroxide, tetrabutylammonium hydroxide or trimethylbenzylammonium hydroxide, a tertiary amine such as triethylamine, dimethylbenzylamine or triphenylamine, a secondary amine such as diethylamine or dibutylamine, a primary amine such as propylamine or butylamine, an imidazole such as 2-methylimidazole, 2-phenylimidazole or benzimidazole, or a base or a basic salt such as ammonia, tetramethylammonium borohydride, tetrabutylammonium borohydride, tetrabutylammonium tetraphenyl borate or tetraphenylammonium tetraphenyl borate can be used.

As a transesterification catalyst, a salt of zinc, tin, zirconium or lead can preferably be used, which may be used alone or in combination. Specifically, zinc acetate, zinc benzoate, zinc 2-ethylhexanoate, tin chloride (II), tin chloride (IV), tin acetate (II), tin acetate (IV), dibutyltin dilaurate, dibutyltin oxide, dibutyltin dimethoxide, zirconium acetylacetonate, zirconium oxyacetate, zirconium tetrabutoxide, lead acetate (II), lead acetate (IV) or the like can be used. Such a catalyst is used at a ratio of $1 \times 10^{-9}$-$1 \times 10^{-3}$ moles and preferably at a ratio of $1 \times 10^{-7}$-$1 \times 10^{-4}$ moles, with respect to a total of 1 mole of a dihydroxy compound.

According to a melt polycondensation method, the above-described raw materials and catalyst are used to conduct melt polycondensation while removing by-products by transesterification upon heating under ordinary or reduced pressure. In general, the reaction is carried out in a multi-stage process, i.e., two or more stages.

In the melt polycondensation with this composition system, a compound represented by General Formula (6) and diester carbonate may be melted in a reaction container, and then allowed to react while retaining, rather than distilling away, a monohydroxy compound produced as a by-product. In such a case, the reaction time during which the monohydroxy compound produced as a by-product is retained rather than being distilled away, is 20 to 240 minutes, preferably 40 to 180 minutes and particularly preferably 60 to 150 minutes. In this case, if the monohydroxy compound produced as a by-product is distilled away immediately after its generation, the content of the high-molecular weight polymer in the resulting polycarbonate resin will be low. The above-mentioned reaction time is merely an example, and preferable reaction time may vary depending on the reaction scale.

Such a reaction may be carried out in either continuous or batch mode. The reaction device used may be of a vertical type equipped with anchor-shaped stirring blades, Maxblend stirring blades, helical ribbon-shaped stirring blades or the like, a horizontal type equipped with paddle blades, lattice blades, spectacle-shaped blades or the like, or an extruder type equipped with a screw. These may suitably be used in combination considering the viscosity of the polymer.

The method for producing a polycarbonate resin is preferably carried out without deactivating the catalyst. If necessary, however, the catalyst may be removed or deactivated after the polymerization reaction in order to retain heat stability and hydrolysis stability. In a case where the catalyst is to be deactivated, a technique of deactivating the catalyst by adding a known acidic substance can favorably be conducted. Specifically, as the acidic substance, an ester such as butyl benzoate; an aromatic sulfonic acid such as p-toluenesulfonic acid; an aromatic sulfonate ester such as butyl p-toluenesulfonic acid or hexyl p-toluenesulfonic acid; a phosphoric acid such as phosphorous acid, phosphoric acid or phosphonic acid; a phosphite ester such as triphenyl phosphite, monophenyl phosphite, diphenyl phosphite, diethyl phosphite, di-n-propyl phosphite, di-n-butyl phosphite, di-n-hexyl phosphite, dioctyl phosphite or monooctyl phosphite; a phosphate ester such as triphenyl phosphate, diphenyl phosphate, monophenyl phosphate, dibutyl phosphate, dioctyl phosphate or monooctyl phosphate; a phosphonic acid such as diphenyl phosphonate, dioctyl phosphonate or dibutyl phosphonate; a phosphonate ester such as diethyl phenyl phosphonate; a phosphine such as triphenyl phosphine or bis(diphenylphosphino)ethane; a boric acid such as a boric acid or phenylboric acid; an aromatic sulfonic acid salt such as dodecylbenzene sulfonate tetrabutyl phosphonium salt; an organic halide such as stearic acid chloride, benzoyl chloride or p-toluenesulfonic acid chloride; an alkyl sulfate such as dimethyl sulfate; an organic halide such as benzyl chloride; or the like can favorably be used, among which butyl p-toluenesulfonic acid is more favorable. Such a deactivating agent can be used in an amount of 0.01-50 mol times and preferably 0.3-20 mol times the amount of the catalyst. If the deactivating agent is less than 0.01 mol times the catalyst amount, the deactivating effect would be inadequate which is unfavorable. On the other hand, if the deactivating agent is more than 50 mol times the catalyst amount, heat resistance of the resin is deteriorated and the molded body is likely to be colored, which are unfavorable.

Following deactivation of the catalyst, a step of devolatilizing and removing the low-boiling compound in the polymer under a pressure of 0.1-1 mmHg at a temperature of 200-350° C. may be provided. For this step, a horizontal type device equipped with stirring blades that have excellent surface renewal capacity such as paddle blades, lattice blades, spectacle-shaped blades or the like, or a thin-film evaporator can preferably be used.

The content of foreign matters in the polycarbonate resin is desirably as small as possible, for which filtration of the molten raw material, filtration of the catalyst solution or the like can favorably be performed. The mesh of the filter is preferably 5 μm or less and more preferably 1 μm or less. Moreover, filtration of the generated resin can favorably be performed with a polymer filter. The mesh of the polymer filter is preferably 100 μm or less and more preferably 30 μm or less. Needless to say, the step for collecting the resin pellets should be carried out in a low dust environment, which is preferably Class 6 or lower and more preferably Class 5 or lower.

<Polycarbonate Resin (B)>

A polycarbonate resin (B) comprises a structural unit (b) represented by General Formula (5). Specifically, a polycarbonate resin (B) is composed of a polymer comprising a structural unit (b) represented by General Formula (5). The polycarbonate resin (B) may comprise the structural unit represented by General Formula (5) alone or two or more types of them in combination.

Although a repeating structural unit of the polycarbonate resin (B) may comprise a structural unit other than the structural unit (b) represented by General Formula (5), the proportion of the structural unit other than the structural unit (b) is preferably 20 mol % or less, more preferably 10 mol % or less and still more preferably 0 mol %, with respect to 100 mol % of the structural unit (b) represented by General Formula (5). Within such range, a high refractive index can be retained. Particularly preferably, the polycarbonate resin (B) consists of a homopolymer consisting of a structural unit represented by General Formula (5).

According to the present invention, all of the junctions between the monomer units in the polycarbonate resin (B) consist of a carbonate bond (—O—(C═O)—O—). Hence, a polyester carbonate resin that has an ester bond (—(C═O)—O—) in addition to the carbonate bond is not comprised by the polycarbonate resin (B) of the present invention. Since the polycarbonate resin (B) does not have a hydrolyzable ester bond, it is capable of achieving lower water absorption and lower birefringence over a polyester carbonate resin.

An average molecular weight Mw of the polycarbonate resin (B) in terms of polystyrene is preferably 15,000-250,000, more preferably 20,000-200,000, still more preferably 20,000-120,000 and particularly preferably 20,000-45,000.

If Mw is less than 20,000, the resin becomes brittle, which is unfavorable. If Mw exceeds 200,000, melt viscosity becomes high such that the produced resin is difficult to be taken out, and moreover fluidity will be poor such that handling in the molten state would be difficult, which are unfavorable.

<Method for Producing Polycarbonate Resin (B)>

A method for producing a polycarbonate resin (B) will be described.

The method for producing a polycarbonate resin (B) is not particularly limited. For example, a dihydroxy compound represented by General Formula (7) can be produced by a melt polycondensation method in the presence of diester carbonate and a catalyst. As the catalyst, a basic compound catalyst, a transesterification catalyst or a mixed catalyst composed of both can be used.

[Chemical Formula 7]

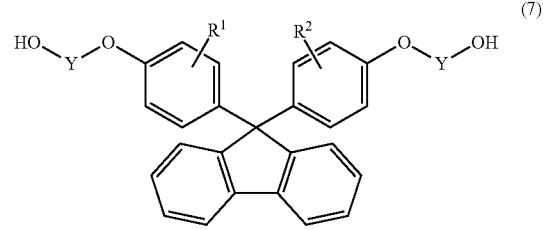

(7)

(in Formula (7), $R^1$ and $R^2$ each independently represent a hydrogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20 or an aryloxy group with a carbon number of 6-20, and Y represents an alkylene group with a carbon number of 1-4).

Among them, a dihydroxy compound represented by General Formula (7) where $R^1$ and $R^2$ are each a hydrogen atom is preferable due to good melt fluidity upon being molded into an optical lens, in which case the polycarbonate resin (B) comprises a structural unit represented by General Formula (5) above where $R^1$ and $R^2$ each represent a hydrogen atom.

Moreover, the larger the carbon number of Y in Formula (7) becomes, the smaller the melt viscosity becomes, by which toughness and moldability are enhanced. Therefore, a compound where Y is an alkylene group with a carbon number of 2 or more is preferable. On the other hand, the larger the carbon number of Y becomes, the lower the glass-transition temperature becomes, and thus a compound represented by Formula (7) where Y is an alkylene group with a carbon number of 3 or less, is preferable in terms of heat resistance. In order to achieve both excellent molding easiness and heat resistance, a compound represented by Formula (7) where Y has a carbon number of 2-3 is more preferable. In terms of excellent refractive index, monomer production and distribution, a compound represented by Formula (7) where Y is an ethylene group with a carbon number of 2 is particularly preferable.

Examples of the dihydroxy compound represented by Formula (7) include 9,9-bis (4-(2-hydroxyethoxy)phenyl) fluorene, 9,9-bis(4-(2-hydroxyethoxy)-3-methylphenyl) fluorene, 9,9-bis(4-(2-hydroxyethoxy)-3-tert-butylphenyl) fluorene, 9,9-bis(4-(2-hydroxy ethoxy)-3-isopropylphenyl) fluorene, 9,9-bis(4-(2-hydroxyethoxy)-3-cyclohexylphenyl) fluorene and 9,9-bis(4-(2-hydroxyethoxy)-3-phenylphenyl) fluorene. Among them, 9,9-bis(4-(2-hydroxyethoxy)phenyl) fluorene is preferable. They may be used alone or two or more types of them may be used in combination.

The polycarbonate resin (B) of the present invention may comprise a structural unit derived from a dihydroxy compound different from the dihydroxy compound represented by General Formula (7). Examples of such other dihydroxy compound include al aliphatic dihydroxy compounds such as ethylene glycol, 1,3-propanediol, 1,2-propanediol, 1,4-butanediol, 1,3-butanediol, 1,2-butanediol, 1,5-heptanediol and 1,6-hexanediol, alicyclic dihydroxy compounds such as 1,2-cyclohexane dimethanol, 1,3-cyclohexane dimethanol, 1,4-cyclohexane dimethanol, tricyclodecane dimethanol, pentacyclopentadecane dimethanol, 2,6-decalin dimethanol, 1,5-decalin dimethanol, 2,3-decalin dimethanol, 2,3-norbornane dimethanol, 2,5-norbornane dimethanol and 1,3-adamantane dimethanol, and aromatic bisphenols such as 2,2-bis(4-hydroxyphenyl) propane [=bisphenol A], 2,2-bis(4-hydroxy-3,5-dimethylphenyl)propane, 2,2-bis(4-hydroxy-3, 5-diethylphenyl)propane, 2,2-bis(4-hydroxy-(3,5-diphenyl) phenyl)propane, 2,2-bis(4-hydroxy-3,5-dibromophenyl) propane, 2,2-bis(4-hydroxyphenyl)pentane, 2,4'-dihydroxydiphenylmethane, bis(4-hydroxyphenyl)methane, bis(4-hydroxy-5-nitrophenyl) methane. 1,1-bis(4-hydroxyphenyl) ethane, 3,3-bis(4-hydroxyphenyl)pentane, 1,1-bis(4-hydroxyphenyl)cyclohexane, bis(4-hydroxyphenyl)sulfone, 2,4'-dihydroxy diphenylsulfone, bis(4-hydroxyphenyl)sulfide, 4,4'-dihydroxy diphenylether, 4,4'-dihydroxy-3,3'-dichlorodiphenylether, 9,9-bis(4-hydroxyphenyl)fluorene and 9,9-bis(4-hydroxy-2-methylphenyl)fluorene.

Here, such other dihydroxy compound is preferably 20 mol % or less and more preferably 10 mol % or less, with respect to 100 mol % of the dihydroxy compound represented by General Formula (7). Within this range, a high refractive index can be retained.

Examples of the diester carbonate include diphenyl carbonate, ditolyl carbonate, bis(chlorophenyl) carbonate, m-cresyl carbonate, dimethyl carbonate, diethyl carbonate, dibutyl carbonate and dicyclohexyl carbonate. Among them, diphenyl carbonate is particularly preferable. Diphenyl carbonate is used preferably at a ratio of 0.90-1.15 moles and more preferably at a ratio of 0.95-1.10 moles, with respect to 1 mole of the dihydroxy compound.

Examples of the basic compound catalyst particularly include alkali metal compounds and/or alkaline-earth metal compounds, and nitrogen-containing compounds.

Examples of the alkali metal compound include organic acid salts, inorganic salts, oxides, hydroxides, hydrides or alkoxides of alkali metals. Specifically, sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate, cesium benzoate, lithium benzoate, disodium hydrogen phosphate, dipotassium hydrogen phosphate, dilithium hydrogen phosphate, disodium phenyl phosphate, a disodium salt, a dipotassium salt, a dicesium salt or a dilithium salt of bisphenol A, a sodium salt, a potassium salt, a cesium salt or a lithium salt of phenol, or the like can be used. Among them, sodium hydrogen carbonate is preferable.

Examples of the alkaline-earth metal compound include organic acid salts, inorganic salts, oxides, hydroxides, hydrides and alkoxides of alkaline-earth metal compounds. Specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate or the like can be used.

Examples of the nitrogen-containing compound include quaternary ammonium hydroxides and salts and amines thereof. Specifically, a quaternary ammonium hydroxide having an alkyl group, an aryl group or the like such as tetramethylammonium hydroxide, tetraethylammonium hydroxide, tetrapropylammonium hydroxide, tetrabutylammonium hydroxide or trimethylbenzylammonium hydroxide, a tertiary amine such as triethylamine, dimethylbenzylamine or triphenylamine, a secondary amine such as diethylamine or dibutylamine, a primary amine such as propylamine or butylamine, an imidazole such as 2-methylimidazole, 2-phenylimidazole or benzimidazole, or a base or a basic salt such as ammonia, tetramethylammonium borohydride, tetrabutylammonium borohydride, tetrabutylammonium tetraphenyl borate or tetraphenylammonium tetraphenyl borate can be used.

As a transesterification catalyst, a salt of zinc, tin, zirconium or lead can preferably be used, which may be used alone or in combination. Specifically, zinc acetate, zinc benzoate, zinc 2-ethylhexanoate, tin chloride (II), tin chloride (IV), tin acetate (II), tin acetate (IV), dibutyltin dilaurate, dibutyltin oxide, dibutyltin dimethoxide, zirconium acetylacetonate, zirconium oxyacetate, zirconium tetrabutoxide, lead acetate (II), lead acetate (IV) or the like can be used. Such a catalyst is used at a ratio of $1 \times 10^{-9}$-$1 \times 10^{-3}$ moles and preferably at a ratio of $1 \times 10^{-7}$-$1 \times 10^{-4}$ moles, with respect to a total of 1 mole of a dihydroxy compound.

According to a melt polycondensation method, the above-described raw materials and catalyst are used to conduct melt polycondensation while removing by-products by transesterification while heating under ordinary or reduced pressure. In general, the reaction takes place in a multi-stage process, i.e., two or more stages.

In the melt polycondensation with this composition system, a compound represented by General Formula (7) and diester carbonate may be melted in a reaction container, and then allowed to react while retaining, rather than distilling away, a monohydroxy compound produced as a by-product. In such a case, the reaction time during which the monohydroxy compound produced as a by-product is retained rather than being distilled away, is 20 to 240 minutes, preferably 40 to 180 minutes and particularly preferably 60 to 150 minutes. In this case, if the monohydroxy compound produced as a by-product is distilled away immediately after its generation, the content of the high-molecular weight polymer in the resulting polycarbonate resin will be low. The above-mentioned reaction time is merely an example, and preferable reaction time may vary depending on the reaction scale.

Such a reaction may be carried out in either continuous or batch mode. The reaction device used may be of a vertical type equipped with anchor-shaped stirring blades, Maxblend stirring blades, helical ribbon-shaped stirring blades or the like, a horizontal type equipped with paddle blades, lattice blades, spectacle-shaped blades or the like, or an extruder type equipped with a screw. These may suitably be used in combination considering the viscosity of the polymer.

The method for producing a polycarbonate resin is preferably carried out without deactivating the catalyst after the polymerization reaction. If necessary, however, the catalyst may be removed or deactivated in order to retain heat stability and hydrolysis stability. In a case where the catalyst is to be deactivated, a technique of deactivating the catalyst by adding a known acidic substance can favorably be conducted. Specifically, as the acidic substance, an ester such as butyl benzoate; an aromatic sulfonic acid such as p-toluenesulfonic acid; an aromatic sulfonate ester such as butyl p-toluenesulfonic acid or hexyl p-toluenesulfonic acid; a phosphoric acid such as phosphorous acid, phosphoric acid or phosphonic acid; a phosphite ester such as triphenyl phosphite, monophenyl phosphite, diphenyl phosphite, diethyl phosphite, di-n-propyl phosphite, di-n-butyl phosphite, di-n-hexyl phosphite, dioctyl phosphite or monooctyl phosphite; a phosphate ester such as triphenyl phosphate, diphenyl phosphate, monophenyl phosphate, dibutyl phosphate, dioctyl phosphate or monooctyl phosphate; a phosphonic acid such as diphenyl phosphonate, dioctyl phosphonate or dibutyl phosphonate; a phosphonate ester such as diethyl phenyl phosphonate; a phosphine such as triphenyl phosphine or bis(diphenylphosphino)ethane; a boric acid such as a boric acid or phenylboric acid; an aromatic sulfonic acid salt such as dodecylbenzene sulfonate tetrabutyl phosphonium salt; an organic halide such as stearic acid chloride, benzoyl chloride or p-toluenesulfonic acid chloride; an alkyl sulfate such as dimethyl sulfate; an organic halide such as benzyl chloride; or the like can favorably be used, among which butyl p-toluenesulfonic acid is more favorable. Such a deactivating agent can be used in an amount of 0.01-50 mol times and preferably 0.3-20 mol times the amount of the catalyst. If the amount of the deactivating agent is less than 0.01 mol times the catalyst amount, the deactivating effect would be inadequate which is unfavorable. On the other hand, if the amount of the deactivating agent is more than 50 mol times the catalyst amount, heat resistance of the resin is deteriorated and the molded body is likely to be colored, which are unfavorable.

Following deactivation of the catalyst, a step of devolatilizing and removing the low-boiling compound in the polymer under a pressure of 0.1-1 mmHg at a temperature of 200-350° C. may be provided. For this step, a horizontal type device equipped with stirring blades that have excellent surface renewal capacity such as paddle blades, lattice blades, spectacle-shaped blades or the like, or a thin-film evaporator can preferably be used.

The content of foreign matters in the polycarbonate resin is desirably as small as possible, for which filtration of the molten raw material, filtration of the catalyst solution or the like can favorably be performed. The mesh of the filter is preferably 5 μm or less and more preferably 1 μm or less. Moreover, filtration of the generated resin can favorably be performed with a polymer filter. The mesh of the polymer filter is preferably 100 μm or less and more preferably 30 μm or less. Needless to say, the step for collecting the resin pellets should be carried out in a low dust environment, which is preferably Class 6 or lower and more preferably Class 5 or lower.

<Polycarbonate Resin Composition>

The polycarbonate resin composition of the present invention comprises at least a polycarbonate resin (A) having a structural unit (a) represented by General Formula (4) and a polycarbonate resin (B) having a structural unit (b) represented by General Formula (5).

The present inventors found that an excellently low birefringence can be achieved while realizing a high refractive index, a low Abbe's number, high transparency and a high glass-transition temperature (heat resistance) by mixing a polycarbonate resin (A) having a structural unit (a) and a polycarbonate resin (B) having a structural unit (b). Moreover, a material having desired refractive index and Abbe's number can be obtained by adjusting the blending ratio of the blend system, the temperature and the decompression degree upon blending, and the like, which allows simple and precise optical material design. In particular, correction of chromatic aberration by use of a combination of multiple lenses can be carried out in a more accurate and simple manner.

The polycarbonate resin composition of the present invention may contain other resin, in addition to the polycarbonate resin (A) and the polycarbonate resin (B), as long as the characteristics of the present invention is not impaired.

Examples of other resin that may be contained in the polycarbonate resin composition of the present invention include: polyethylene, polypropylene, polyvinyl chloride, polystyrene, (meth)acryl resin, ABS resin, polyamide, polyacetal, polycarbonate (but not polycarbonate resin (A) or polycarbonate resin (B)), polyphenylene ether, polyester, polyphenylene sulfide, polyimide, polyethersulfone, polyether ether ketone, fluorine resin, cycloolefin polymer, an ethylene-vinyl acetate copolymer, an epoxy resin, a silicone resin, a phenol resin, an unsaturated polyester resin and polyurethane.

Other resin that may be contained in the polycarbonate resin composition of the present invention is preferably 20 parts or less by mass and more preferably 10 parts or less by mass with respect to the total mass of the polycarbonate resin (A) and the polycarbonate resin (B). If the content exceeds this, compatibility and transparency may become poor.

More preferably, in order to maintain low optical distortion which is characteristic of the present invention, the polycarbonate resin (A) is composed of the structural unit (a) and the polycarbonate resin (B) is composed of the structural unit (b). A preferable embodiment is a polycarbonate resin composition in which the polycarbonate resin (A) comprises a homopolymer consisting of the structural unit (a) and the polycarbonate resin (B) comprises a homopolymer consisting of the structural unit (b). A more preferable embodiment is a polycarbonate resin composition in which the polycarbonate resin (A) consists of a homopolymer consisting of the structural unit (a) and the polycarbonate resin (B) consists of a homopolymer consisting of the structural unit (b). Moreover, a resin composition composed only of the polycarbonate resin (A) and the polycarbonate resin (B) is particularly preferable. In a particularly preferable embodiment, the polycarbonate resin composition composed only of a polycarbonate resin (A) comprising a homopolymer consisting of a structural unit (a) and a polycarbonate resin (B) comprising a homopolymer consisting of a structural unit (b).

<Method for Producing Polycarbonate Resin Composition>

A method for producing a polycarbonate resin composition of the present invention is not particularly limited. For example, the polycarbonate resin composition can be produced by any of the following methods:

[1] A method in which solids (preferably, pellets) of each of the polycarbonate resins (A) and (B) are mixed and kneaded with a kneading machine;
[2] A method in which (B) in a solid state (preferably, pellets) is added to (A) in a molten state, and then kneaded;
[3] A method in which (A) in a solid state (preferably, pellets) is added to (B) in a molten state, and then kneaded; or
[4] A method in which resins (A) and (B) in molten states are mixed and kneaded, Kneading may be carried out in either continuous or batch mode. The kneading machine may favorably be an extruder in a case of a continuous mode and Labo Plastomill or a kneader in a case of a batch mode. Examples of the extruder include a single-screw extruder, a twin-screw extruder and a multi-screw extruder. The extruder may appropriately be provided with a gear pump or the like for stably quantifying the discharge amount of the resin. The atmospheric pressure for melt kneading the resin composition is not particularly limited, and ambient pressure or reduced pressure. For example, ambient pressure (760 mmHg) to 0.1 mmHg, is preferable from the viewpoint of prevention of oxidation and removal of a decomposed Matter, a low-boiling component such as phenol, or the like. The extruder may be either a vent type no-vent type. It is preferably a vent-type extruder in terms of improving quality of the extruded product. The pressure at the vent port (vent pressure) may be either ambient pressure or reduced pressure. It may be, for example, a pressure of ambient pressure (760 mmHg) to 0.1 mmHg, preferably a pressure of about 100-0.1 mmHg, more preferably a pressure of about 50-0.1 mmHg from the viewpoint of prevention of oxidation and removal of a decomposed matter, a low-boiling component such as phenol, or the like. Furthermore, hydrogenation/devolatilization may be carried out for the purpose of efficiently reducing a low-boiling component such as phenol.

The proportions of the blend of polycarbonate resins (A) and (B) are such that they are blended at a mass ratio $(100\times(A))/((A)+(B))$ of preferably 1-99% and more preferably 5-90%. In addition, $(100\times(A))/((A)+(B))$ is more preferably 10-90% for achieving desired refractive index and Abbe's number, and still more preferably 25-75% for further enhancing low birefringence, particularly preferably 25-60% also in terms of excellent heat resistance, and most preferably 40-70% in terms of excellent balance between heat resistance and optical physical properties.

The polycarbonate resin composition of the present invention may comprise two or more types of each of the polycarbonate resins (A) and (B). In such a case, each of (A) and (B) in Formula $(100\times(A))/((A)+(B))$ represents a total mass of the two or more types of the polycarbonate resin (A) or (B), respectively.

The temperature for melt kneading, the resin composition is preferably 240° C. or higher and more preferably 260° C. or higher in terms of surface smoothness. If the melt kneading temperature is too high, reduction in the molecular weight of the polycarbonate resin may be promoted and the strength may become poor. Accordingly, in terms of heat stability, the melt kneading temperature is preferably 400° C. or lower, more preferably 290° C. or lower, and still more preferably 270° C. or lower.

The difference between the weight average molecular weights of the polycarbonate resins (A) and (B) in terms of polystyrene (ΔMw) is preferably 0-120,000, more preferably 0-80,000, and still more preferably 0-20,000. Within this range, the difference between the viscosities of the polycarbonate resins (A) and (B) would not be too large, compatibility would be good, and transparency of the blended resin compositions would be high, which are favorable.

In addition, an antioxidant, a mold release agent, an ultraviolet absorber, a fluidity modifier, a reinforcing agent, a crystal nucleating agent, a dye, an antistatic agent, an antibacterial agent or the like may be added to the polycarbonate resin composition of the present invention, if necessary. These additives may be added to both or either one of polycarbonate resins (A) and (B) before kneading, or may be added and kneaded simultaneously upon blending/kneading, or may be added after mixing.

Although the polycarbonate resin composition of the present invention may contain a polycarbonate other than the polycarbonate resins (A) and (B), it is more preferable that the composition contains substantially no other polycarbonate.

Examples of the antioxidant include triethylene glycolbis[3-(3-tert-butyl-5-methyl-4-hydroxyphenyl)propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl) propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzyl phosphonate-diethyl ester, tris(3,5-di-tert-butyl-4-hydroxy-benzyl)isocyanurate and 3,9-bis{1,1-dimethyl-2-[(3-(3-tert-butyl-4-hydroxy-5-methylphenyl)propionyloxy]ethyl}-2,4,8,10-tetraoxaspiro(5,5) undecane. Among them, pentaerythritol-tetrakis[3-(3,5-di-tert-butyl-4-hydroxyphenyl) propionate] is preferable. The content of an antioxidant in the polycarbonate resin is preferably 0.001-0.3 parts by mass with respect to 100 parts by mass of the polycarbonate resin.

Examples of the processing stabilizer include phosphorus-based processing heat stabilizers and sulfur-based processing heat stabilizers. Examples of the phosphorus-based processing heat stabilizers include phosphite, phosphoric acid, phosphonous acid, phosphonic acid and esters thereof. Specific examples include triphenyl phosphite, tris(nonylphenyl)phosphite, tris(2,4-di-tert-butylphenyl)phosphite, tris(2,6-di-tert-butylphenyl)phosphite, tridecyl phosphite, trioctyl phosphite, trioctadecyl phosphite, didecyl monophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-dicumylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzenephosphonate, diethyl benezenephosphonate, dipropyl benezenephosphonate, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2.4-di-tert-butylphenyl)-4-phenyl-phenyl phosphonite and bis(2,4-di-tert-butylphenyl)-3-phenyl-phenyl phosphonite. The content of the phosphorus-based processing heat stabilizer in the polycarbonate resin is preferably 0.001-0.2 parts by mass to 100 parts by mass of the polycarbonate resin.

Examples of the sulfur-based processing heat stabilizer include pentaerythritol-tetrakis(3-laurylthio propionate), pentaerythritol-tetrakis(3-myristylthio propionate), pentaerythritol-tetrakis(3-stearylthio propionate), dilauryl-3,3'-thio dipropionate, dimyristyl-3,3'-thio dipropionate and distearyl-3,3'-thio dipropionate. The content of the sulfur-based processing heat stabilizer in the polycarbonate resin is preferably 0.001-0.2 parts by mass to 100 parts by mass of the polycarbonate resin.

Preferably, 90 mass % or more of the mold release agent is made from an ester of alcohol and fatty acid. Specific examples of the ester of alcohol and fatty acid include esters of monohydric alcohol and fatty acid, and partial esters or complete esters of polyhydric alcohol and fatty acid. The above-described ester of monohydric alcohol and fatty acid is preferably an ester of a monohydric alcohol with a carbon atom number of 1-20 and a saturated fatty acid with a carbon atom number of 10-30. The partial ester or the complete ester of polyhydric alcohol and fatty acid is preferably a partial ester or a complete ester of a polyhydric alcohol with a carbon atom number 1-25 and a saturated fatty acid with a carbon atom number of 10-30.

Specific examples of the ester of a monohydric alcohol and a saturated fatty acid include stearyl stearate, palmityl palmitate, butyl stearate, methyl laurate and isopropyl palmitate. Examples of the partial ester or the complete ester of a polyhydric alcohol and a saturated fatty acid include complete esters or partial esters of dipentaerythritol such as monoglyceride stearate, monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate and dipentaerythritol hexastearate. Among them, stearate monoglyceride and laurate monoglyceride are particularly preferable. The content of such mold release agent is preferably in a range of 0.005-2.0 parts by mass, more preferably in a range of 0.01-0.6 parts by mass and still more preferably 0.02-0.5 parts by mass, with respect to 100 parts by mass of polycarbonate resin.

As the ultraviolet absorber, at least one ultraviolet absorber selected from the group consisting of benzotriazole-based ultraviolet absorbers, benzophenone-based ultraviolet absorbers, triazine-based ultraviolet absorbers, cyclic imino ester-based ultraviolet absorbers and cyanoacrylate-based ultraviolet absorbers is preferable. Specifically, any of the following ultraviolet absorbers may be used alone or two or more types of them may be used in combination.

Examples of the benzotriazole-based ultraviolet absorbers include 2-(2-hydroxy-5-methylphenyl)benzotriazole, 2-(2-hydroxy-5-tert-octyl phenyl)benzotriazole, 2-(2-hydroxyl-3,5-dicumylphenyl)phenylbenzotriazole, 2-(2-hydroxy-3-tert-butyl-5-methyl phenyl)-5-chlorobenzotriazole, 2,2'-methylenebis[4-(1,1,3,3-tetramethylbutyl)-6-(2N-benzotriazole-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amyl phenyl)benzotriazole, 2-(2-hydroxy-5-tert-octyl phenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazine-4-one) and 2-[2-hydroxy-3-(3,4,5,6-tetrahydrophthalimidemethyl)-5-methylphenyl] benzotriazole.

Examples of the benzophenone-based ultraviolet absorbers include 2,4-dihydroxy benzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydridate benzophenone, 2,2'-dihydroxy-4-methoxy benzophenone, 2,2',4,4'-tetrahydroxybenzophenone, 2,2'-dihydroxy-4,4'-dimethoxy benzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

Examples of the triazine-based ultraviolet absorbers include 2-(4,6-diphenyl-1,3,5-triazine-2-yl)-5-[(hexyl)oxy]-phenol, 2-(4,6-bis(2,4-dimethylphenyl)-1,3,5-triazine-2-yl)-5-[(octyl)oxy]-phenol and 2,4,6-tris(2-hydroxy-4-hexyloxy-3-methylphenyl)-1,3,5-triazine.

Examples of the cyclic imino ester-based ultraviolet absorbers include 2,2'-bis(3,1-benzoxazine-4-one), 2,2'-p-phenylenebis(3,1-benzoxazine-4-one), 2,2-m-phenylenebis(3,1-benzoxazine-4-one), 2,2'-(4,4'-diphenylene)bis(3,1-benzoxazine-4-one), 2,2'-(2,6-naphthalene)bis(3,1-benzoxazine-4-one), 2,2'-(1,5-naphthalene)bis(3,1-benzoxazine-4-one), 2,2'-(2-methyl-p-phenylene)bis(3,1-benzoxazine-4-one), 2,2'-(2-nitro-p-phenylene)bis(3,1-benzoxazine-4-one) and 2,2'-(2-chloro-p-phenylene)bis(3,1-benzoxazine-4-one).

Examples of the cyanoacrylate-based ultraviolet absorbers include 1,3-bis-[(2'-cyano-3',3'-diphenylacryloyl)oxy]-2,2-bis[(2-cyano-3,3-diphenylacryloyl)oxy] methyl)propane and 1,3-bis-[(2-cyano-3,3-diphenylacryloyl)oxy]benzene.

The content of the ultraviolet absorber is preferably 0.01-3.0 parts by mass, more preferably 0.02-1.0 parts by mass and still more preferably 0.05-0.8 parts by mass, with respect to 100 parts by mass of the polycarbonate resin. As long as the blending amount is within such range, sufficient weatherability can be imparted to the polycarbonate resin depending on usage.

<Method for Producing Molded Body>

A molded body can be produced by using the polycarbonate resin of the present invention. For example, it may be molded by an arbitrary method such as an injection molding method, a compression molding method, an extrusion molding method or a solution-casting method. Since the polycarbonate resin composition of the present invention has excellent moldability (good fluidity) and heat resistance (high glass-transition temperature), it can advantageously be used particularly for an optical lens that requires injection molding.

<Physical Properties of Polycarbonate Resin Composition and Molded Body>

The molecular weight (weight average molecular weight (Mw) in terms of polystyrene; weight average molecular weight after mixing) of the polycarbonate resin composition of the present invention is preferably 20000-200000, more preferably 25000-120000 and particularly preferably 25000-50000.

The glass-transition point (Tg) of the polycarbonate resin composition of the present invention is preferably 95° C.-180° C., more preferably 115° C.-160° C., still more preferably 125-160° C., particularly preferably 125-145° C. and most preferably 125-140° C.

The refractive index of a molded body produced from the polycarbonate resin composition of the present invention is preferably 1.640-1.680, more preferably 1.645-1.675 and still more preferably 1.650-1.670.

The Abbe's number of the molded body produced from the polycarbonate resin composition of the present invention is preferably 24 or lower, more preferably 23 or lower and particularly preferably 22 or lower. Although the lower limit of the Abbe's number is not particularly limited, it is preferably 18 or higher if the molded body is used as an optical lens considering the specifications upon use.

As to the optical distortion of the polycarbonate resin composition of the present invention, light leakage is preferably slight rather than significant when a molded piece of the polycarbonate resin composition of the present invention is placed between two polarizing plates and light leakage from the back is visually observed by a crossed Nicol method. The optical distortion has correlation with the birefringence of the resin composition, where small optical distortion, i.e., less light leakage, means that the birefringence index of the resin composition is low (small). Specifically, the orientation-dependent birefringence (Δn) of the resin composition is preferably 0.250 or lower, more preferably 0.200 or lower and still more preferably 0.150 or lower.

Method for measuring weight average molecular weight (Mw) in terms of polystyrene: Gel permeation chromatograph (GPC) is employed to generate a calibration curve, using tetrahydrofuran as a developing solvent as well as a standard polystyrene having a known molecular weight (molecular weight distribution=1). Based on this calibration curve, weight average molecular weight is calculated from retention time of GPC.

[Measurement Conditions]
Device; HLC-8320GPC manufactured by Tosoh Corporation
Columns; Guard column: TSK guard column Super MPHZ-M×1 column
  Analytical column: TSKgel SuperMultipore HZ-M×3 columns
Solvent; Tetrahydrofuran
Injected amount; 10 μL
Sample concentration; 0.2 w/v % tetrahydrofuran solution
Solvent flow rate; 0.35 ml/min
Measurement temperature; 40° C.
Detector; RI Method for measuring glass-transition temperature (Tg): measured with a differential thermal scanning calorimeter (DSC).

DSC7000X, Hitachi High-Technologies Corporation

Method for measuring refractive index (nD): measured with an Abbe's refractometer using a polycarbonate resin that has been press-molded into a cuboid of 3 mm (thickness)×8 mm×8 mm.

Method for measuring Abbe's number (ν): calculated following the formula below from refractive indices at wavelengths of 486 nm, 589 nm and 656 nm with Abbe's refractometer, by using a polycarbonate resin that has been press-molded into a cuboid of 3 mm (thickness)×8 mm×8 mm:

$$\nu=(nD-1)/(nF-nC)$$

nD: Refractive index at a wavelength of 589 nm
nC: Refractive index at a wavelength of wavelength 656 nm
nF: Refractive index at a wavelength of 486 nm Method for observing optical distortion: evaluated by a crossed Nicol method by visually observing light leakage from the back of two polarizing plates that has a molded piece of the polycarbonate resin composition of the present invention with a thickness of 3 mm therebetween. Evaluations are as follows: A: slight light leakage is observed, B: light leakage is observed, and C: light leakage is significant.

Method for measuring orientation-dependent birefringence (Δn): A polycarbonate resin is dissolved in methylene chloride to prepare a resin solution with a solid content concentration of 6.0 mass %. This resin solution is poured into a cast film mold, peeled off after volatilizing the methylene chloride and dried to prepare a cast film with a thickness of 0.1 mm. The resulting cast film with a thickness of 0.1 mm is cut into a 5.0 cm square, and then the both ends of the film is pinched by chucks (distance between the chucks: 3.0 cm), and stretched 1.5-fold at [Tg of the polycarbonate resin+20° C.]. The phase retardation (Re) at 700 nm is measured with ellipsometer M-220 manufactured by JASCO Corporation to determine the orientation-dependent birefringence (Δn) following the formula below.

$$\Delta n = Re/d$$

Δn: Orientation-dependent birefringence
Re: Phase retardation
d: Thickness

<Application of Polycarbonate Resin Composition>

Since a molded body produced from the polycarbonate resin composition of the present invention has low birefringence. It is suitable as a raw material for optical materials such as a lens, an optical film and an optical sheet. Specifically, one aspect of the present invention provides an optical material using a molded body produced from a polycarbonate resin composition of the above-described embodiment. In particular, it is favorable for an optical material such as a lens due to its low refraction property and high transparency. One embodiment of the present invention is an optical lens using a molded body produced from a polycarbonate resin composition of the above-described embodiment.

If necessary, the surface of the optical molded body may be provided with a coat layer such as an antireflection layer or a hard coat layer. The antireflection layer may be either a single layer or a multilayer and may be either an organic substance or an inorganic substance, but preferably an inorganic substance. Specifically, examples include oxides or fluorides such as silicon oxide, aluminum oxide, zirconium oxide, titanium oxide, cerium oxide, magnesium oxide and magnesium fluoride.

<Optical Lens>

Since an optical lens produced by using the polycarbonate resin composition of the present invention has a high refractive index and excellent heat resistance. It can be used in a field that conventionally employs an expensive high refractive index glass lens, for example, telescopes, binoculars, TV projectors or the like, which is extremely useful. If necessary, it is preferably used in a form of an aspherical lens. Since an aspherical lens is capable of correcting spherical aberration to substantially zero with one lens, there is no need of cancelling the spherical aberration with a combinational use of a plurality of spherical lenses, and thus reduction in weight and reduction in production cost can be realized. Accordingly, an aspherical lens is particularly useful as a camera lens among the optical lenses.

Furthermore, an optical lens is molded by an arbitrary method such as an injection molding method, a compression molding method or an injection compression molding method. According to the present invention, an aspherical lens with a high refractive index and a low birefringence that is technically difficult to process with a glass lens can be obtained in a simple manner.

In order to prevent a foreign matter from mixing into an optical lens, the molding environment should be a low dust environment, which is preferably Class 6 or lower and more preferably Class 5 or lower.

<Optical Film>

Since an optical film produced from the polycarbonate resin composition of the present invention has excellent transparency and heat resistance, it can favorably be used as a film for a liquid crystal substrate, an optical memory card or the like.

In order to prevent a foreign matter from mixing into an optical film, the molding environment should be a low dust environment, which is preferably Class 6 or lower and more preferably Class 5 or lower.

Besides the above-described optical molded bodies, examples of applications also include an optical fiber, an optical disc, a tail light or a meter cover for vehicles, and an artificial marble using a suitable filler such as silica.

EXAMPLES

Hereinafter, the present invention will be described by way of examples, although the present invention should not be limited in any way to these examples. The measurement values in the examples were measured by the following methods or devices.

1) Weight average molecular weight (Mw) in terms of polystyrene: Gel permeation chromatograph (GPC) was employed to generate a calibration curve, using tetrahydrofuran as a developing solvent as well as a standard polystyrene having a known molecular weight (molecular weight distribution=1). Based on this calibration curve, weight average molecular weight was calculated from retention time of GPC.

[Measurement Conditions]

Device; HLC-8320GPC manufactured by Tosoh Corporation

Columns; Guard column: TSK guard column Super MPHZ-M×1 column

Analytical column: TSKgel SuperMultipore HZ-M×3 columns

Solvent; Tetrahydrofuran

Injected amount; 10 μL

Sample concentration; 0.2 w/v % tetrahydrofuran solution

Solvent flow rate; 0.35 ml/min

Measurement temperature; 40° C.

Detector; RI

2) Glass-transition temperature (Tg): measured with a differential thermal scanning calorimeter (DSC).

DSC7000X, Hitachi High-Technologies Corporation

3) Refractive index (nD): measured with an Abbe's refractometer using a polycarbonate resin that has been press-molded into a cuboid of 3 mm (thickness)×8 mm×8 mm.

4) Abbe's number (ν): calculated following the formula below from refractive indices at wavelengths 4486 nm, 589 nm and 656 nm with Abbe's refractometer manufactured by ATAGO, by using a polycarbonate resin that has been press-molded into a cuboid of 3 mm (thickness)×8 mm×8 mm:

$$\nu=(nD-1)/(nF-nC)$$

nD: Refractive index at a wavelength of 589 nm nC: Refractive index at a wavelength of wavelength 656 nm nF: Refractive index at a wavelength of 486 nm 5) Optical distortion: evaluated by a crossed Nicol method by visually observing light leakage from the back of two polarizing plates that has a molded piece of the polycarbonate resin composition of the present invention with a thickness of 3 mm therebetween. More specifically, polycarbonate resins obtained in Examples 1-5 and Comparative Examples 1-3 were subjected to injection molding using ROBOSHOT S-2000i30A injection molding machine manufactured by Fanuc Corporation to obtain molded pieces with a diameter of 50 mm and a thickness of 3 mm. Each of these molded pieces was placed between two polarizing plates to visually observe light leakage from the back for evaluation by a cross Nicol method. Evaluations were as follows: A: slight light leakage was observed, B: flat leakage was observed, and C: flat leakage was significant.

6) Orientation-dependent birefringence (Δn): A cast film with a thickness of 0.1 mm was cut into a 5.0 cm square, and then the both ends of the film was pinched by chucks (distance between the chucks: 3.0 cm), and stretched 1.5-fold at [Tg of the polycarbonate resin+20° C.]. The phase retardation (Re) at 700 nm was measured with ellipsometer M-220 manufactured by JASCO Corporation to determine the orientation-dependent birefringence (Δn) following the formula below.

$$\Delta n=Re/d$$

Δn: Orientation-dependent birefringence

Re: Phase retardation d: Thickness

Here, the cast films used for the measurement of orientation-dependent birefringence (Δn) were prepared as follows. Each of the polycarbonate resins obtained in Examples 1-5 and Comparative Examples 1-3 was dissolved in methylene chloride to prepare a resin solution with a solid content concentration of 6.0 mass %. This resin solution was poured into a cast film mold, peeled off after volatilizing the methylene chloride and dried to prepare a cast film with a thickness of 0.1 mm.

<Synthetic Example 1> (Production of Polycarbonate Resin (A1))

20.0 kg (53.4 moles) of 2,2'-bis(2-hydroxyethoxy)-1,1'-binaphthyl, 11.7 kg (54.5 moles) of diphenyl carbonate and $6.7\times10^{-2}$ g ($8.0\times10^{-4}$ moles) of sodium hydrogen carbonate were placed into a 50-liter reactor equipped with an agitator and a distillation device, heated and agitated to 200° C. under a nitrogen atmosphere of 760 mmHg by spending an hour. Subsequently, agitation was performed for 110 minutes under the same conditions. Then, the decompression degree was adjusted to 200 mmHg by spending 20 minutes, and the resultant was maintained under the conditions of 200° C. and 200 mmHg for 40 minutes for transesterification. Furthermore, the temperature was increased to 230° C. at a rate of 45° C./hr, and the resultant was maintained at 230° C. and 200 mmHg for 10 minutes. Thereafter, the decompression degree was adjusted to 150 mmHg by spending 20 minutes, and the resultant was maintained at 230° C. and 150 mmHg for 10 minutes. Thereafter, the decompression degree was adjusted to 120 mmHg by spending 10 minutes, and the resultant was maintained at 230° C. and 120 mmHg for 70 minutes. Thereafter, the decompression degree was adjusted to 100 mmHg by spending 10 minutes, and the resultant was maintained at 230° C. and 100 mmHg for 10 minutes. Moreover, the decompression degree was adjusted to 1 mmHg or less by spending for another 40 minutes, to carry out polymerization reaction under the conditions of 230° C. and 1 mmHg or less for 30 minutes while agitating. At the end of the reaction, nitrogen was blown into the reactor for applying pressure, and the generated polycarbonate resin was taken out while pelletizing. The resulting polycarbonate resin (A1) had Mw of 33000 and Tg of 115° C.

<Synthetic Example 2> (Production of Polycarbonate Resin (B1))

19.5 kg (44.5 moles) of 9,9-bis(4-(2-hydroxyethoxy)phenyl)fluorene, 9.93 kg (46.3 moles) of diphenyl carbonate, and $2.2 \times 10^{-2}$ g ($2.7 \times 10^{-4}$ moles) of and sodium hydrogen carbonate were placed into a 50-liter reactor equipped with an agitator and a distillation device, heated and agitated to 215° C. under a nitrogen atmosphere of 760 mmHg for an hour. Then, the decompression degree was adjusted to 150 mmHg by spending 15 minutes, and the resultant was maintained under the conditions of 215° C. and 15 mmHg for 20 minutes for transesterification. Furthermore, the temperature was increased to 240° C. at a rate of 37.5° C./hr, and the resultant was maintained at 240° C. and 150 mmHg for 10 minutes. Thereafter, the decompression degree was adjusted to 120 mmHg by spending 10 minutes, and the resultant was maintained at 240° C. and 120 mmHg for 70 minutes. Thereafter, the decompression degree was adjusted to 100 mmHg by spending 10 minutes, and the resultant was maintained at 240° C. and 100 mmHg for 10 minutes. Moreover, the decompression degree was adjusted to 1 mmHg or less by spending for another 40 minutes, to carry out polymerization reaction under the conditions of 240° C. and 1 mmHg or less for 10 minutes while agitating. At the end of the reaction, nitrogen was blown into the reactor for applying pressure, and the generated polycarbonate resin was taken out while pelletizing. The resulting polycarbonate resin (B1) had Mw of 25000 and Tg of 146° C.

Example 1

0.44 kg of the polycarbonate resin pellets (A1) produced in Synthetic Example 1 and 4.57 kg of the polycarbonate resin pellets (B1) produced in Synthetic Example 2 were thoroughly shaken up, then the polycarbonate resin (A1) and the polycarbonate resin (B1) in molten states were kneaded with an extruder (IPEC IPT-type 35 mm co-rotating twin-screw extruder) at 260° C. and a vent pressure of 25 mmHg, and the resultant was pelletized to obtain 3.3 kg of blend pellets. Tg of the pellets was 142° C. with no inflection point. Moreover, Mw of the pellets was 26,000. These pellets were injection molded to obtain a circular disc with a diameter of 50 mm and a thickness of 3 mm. The circular disc was transparent. The evaluation results are shown in Table 1.

Example 2

1.34 kg of the polycarbonate resin pellets (A1) produced in Synthetic Example 1 and 3.66 kg of the polycarbonate resin pellets (B1) produced in Synthetic Example 2 were thoroughly shaken up, then the polycarbonate resin (A1) and the polycarbonate resin (B1) in molten states were kneaded with an extruder (IPEC IPT-type 35 mm co-rotating twin-screw extruder) at 260° C. and a vent pressure of 25 mmHg, and the resultant was pelletized to obtain 3.3 kg of blend pellets. Tg of the pellets was 136° C. with no inflection point. Moreover, Mw of the pellets was 27,000. These pellets were injection molded to obtain a circular disc with a diameter of 50 mm and a thickness of 3 mm. The circular disc was transparent. The evaluation results are shown in Table 1.

Example 3

2.30 kg of the polycarbonate resin pellets (A1) produced in Synthetic Example 1 and 2.70 kg of the polycarbonate resin pellets (B1) produced in Synthetic Example 2 were thoroughly shaken up, then the polycarbonate resin (A1) and the polycarbonate resin (B1) in molten states were kneaded with an extruder (IPEC IPT-type 35 mm co-rotating twin-screw extruder) at 260° C. and a vent pressure of 25 mmHg, and the resultant was pelletized to obtain 3.2 kg of blend pellets. Tg of the pellets was 128° C. with no inflection point. Moreover, Mw of the pellets was 28,000. These pellets were injection molded to obtain a circular disc with a diameter of 50 mm and a thickness of 3 mm. The circular disc was transparent. The evaluation results are shown in Table 1.

Example 4

3.33 kg of the polycarbonate resin pellets (A1) produced in Synthetic Example 1 and 1.67 kg of the polycarbonate resin pellets (B1) produced in Synthetic Example 2 were thoroughly shaken up, then the polycarbonate resin (A1) and the polycarbonate resin (B1) in molten states were kneaded with an extruder (IPEC IPT-type 35 mm co-rotating twin-screw extruder) at 260° C. and a vent pressure of 25 mmHg, and the resultant was pelletized to obtain 3.3 kg of blend pellets. Tg of the pellets was 123° C. with no inflection point. Moreover, Mw of the pellets was 30,000. These pellets were injection molded to obtain a circular disc with a diameter of 50 mm and a thickness of 3 mm. The circular disc was transparent. The evaluation results are shown in Table 1.

Example 5

4.43 kg of the polycarbonate resin pellets (A1) produced in Synthetic Example 1 and 0.58 kg of the polycarbonate resin pellets (B1) produced in Synthetic Example 2 were thoroughly shaken up, then the polycarbonate resin (A1) and the polycarbonate resin (B1) in molten states were kneaded with an extruder (IPEC IPT-type 35 mm co-rotating twin-screw extruder) at 260° C. and a vent pressure of 25 mmHg, and the resultant was pelletized to obtain 3.3 kg of blend pellets. Tg of the pellets was 117° C. with no inflection point. Moreover, Mw of the pellets was 32,000. These pellets were injection molded to obtain a circular disc with a diameter of 50 mm and a thickness of 3 mm. The circular disc was transparent. The evaluation results are shown in Table 1.

Comparative Example 1

Pellets of a polycarbonate resin "Iupilon H-4000" (trade name: manufactured by Mitsubishi Engineering-Plastics Corporation, MW: 33000) made of a bisphenol A-type polycarbonate resin was injection molded to obtain a circular disc with a diameter of 50 mm and a thickness of 3 mm. The circular disc was transparent. The evaluation results are shown in Table 1.

Comparative Example 2

The pellets prepared in Synthetic Example 1 was injection molded to obtain a circular disc with a diameter of 50 mm and a thickness of 3 mm.

The circular disc was transparent. The evaluation results are shown in Table 1.

Comparative Example 3

The pellets prepared in Synthetic Example 2 was injection molded to obtain a circular disc with a diameter of 50 mm and a thickness of 3 mm.

The circular disc was transparent. The evaluation results are shown in Table 1.

TABLE 1

| Resin composition | Example 1 | Example 2 | Example 3 | Example 4 | Example 5 | Comparative Example 1 | Comparative Example 2 | Comparative Example 3 |
|---|---|---|---|---|---|---|---|---|
| Part by mass of Resin (A1) | 8.8 | 26.8 | 46.0 | 66.6 | 88.4 | — | 100.0 | — |
| Part by mass of Resin (B1) | 91.2 | 73.2 | 54.0 | 33.4 | 11.6 | — | — | 100.0 |
| Part by mass of H4000 | — | — | — | — | — | 100.0 | — | — |
| Tg (° C.) | 142 | 136 | 128 | 123 | 117 | 146 | 115 | 146 |
| Refractive index nD | 1.642 | 1.646 | 1.652 | 1.659 | 1.665 | 1.586 | 1.668 | 1.639 |
| Abbe's number ν | 23 | 22 | 21 | 20 | 19 | 30 | 19 | 24 |
| Optical distortion | B | A | A | A | A | C | B | B |
| Orientation-dependent birefringence $\Delta n(\times 10^{-3})$ | 0.224 | 0.140 | 0.050 | 0.044 | 0.150 | 3.95 | 0.203 | 0.265 |

INDUSTRIAL APPLICABILITY

According to the present invention, an optical material with a low birefringence and a high refractive index can be obtained. Since an optical material of the present invention has a high glass-transition point and good fluidity, it can be injection molded, and is highly productive and inexpensive. Therefore, it can be used in a field that conventionally employs an expensive high-refractive-index glass lens, for example, cameras, telescopes, binoculars, TV projectors or the like, and thus is extremely useful. Moreover, according to the present invention, an aspherical lens with a high refractive index and a low birefringence that is technically difficult to process with a glass lens can be obtained by injection molding in a simple manner, which is extremely useful.

The invention claimed is:

1. A polycarbonate resin composition comprising a polycarbonate resin (A) having a structural unit (a) represented by General Formula (4), and a polycarbonate resin (B) having a structural unit (b) represented by General Formula (5)

[Chemical Formula 1]

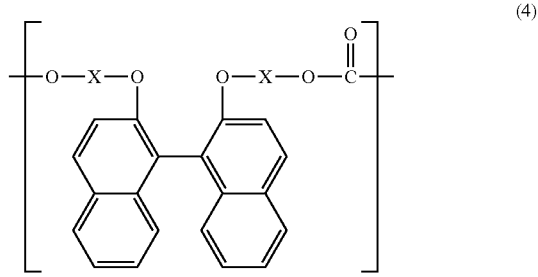

(in Formula (4), X represents an alkylene group with a carbon number of 1-4)

[Chemical Formula 2]

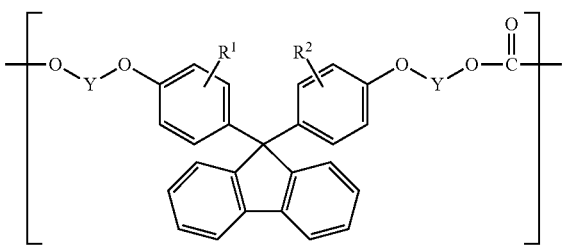

(in Formula (5), $R^1$ and $R^2$ each independently represent a hydrogen atom, an alkyl group with a carbon number of 1-20, an alkoxyl group with a carbon number of 1-20, a cycloalkyl group with a carbon number of 5-20, a cycloalkoxyl group with a carbon number of 5-20, an aryl group with a carbon number of 6-20 or an aryloxy group with a carbon number of 6-20, and Y represents an alkylene group with a carbon number of 1-4).

2. The polycarbonate resin composition according to claim 1, wherein the proportion of a structural unit other than the structural unit (a) in the polycarbonate resin (A) is 20 mol % or less with respect to the structural unit (a).

3. The polycarbonate resin composition according to claim 1, wherein the proportion of a structural unit other than the structural unit (b) in the polycarbonate resin (B) is 20 mol % or less with respect to the structural unit (b).

4. The polycarbonate resin composition according to claim 1, wherein the mass ratio (A:B) of the polycarbonate resin (A) and the polycarbonate resin (B) is 25:75-90:10.

5. The polycarbonate resin composition according to claim 1, wherein the polycarbonate resin (A) comprises a homopolymer consisting of the structural unit (a) and the polycarbonate resin (B) comprises a homopolymer consisting of the structural unit (b).

6. The polycarbonate resin composition according to claim 5, wherein the polycarbonate resin (A) consists of a homopolymer consisting of the structural unit (a) and the polycarbonate resin (B) consists of a homopolymer consisting of the structural unit (b).

7. The polycarbonate resin composition according to claim 1, wherein X is an ethylene group.

8. The polycarbonate resin composition according to claim 1, wherein $R^1$ and $R^2$ are hydrogen atoms.

9. The polycarbonate resin composition according to claim 1, wherein the average molecular weight (Mw) of the polycarbonate resin (A) in terms of polystyrene is 20,000-300,000, and the average molecular weight (Mw) of the polycarbonate resin (B) in terms of polystyrene is 15,000-250,000.

10. The polycarbonate resin composition according to claim 1, wherein the glass-transition point (Tg) is 95° C.-180° C.

11. A molded body produced from the polycarbonate resin composition according to claim 1.

12. The molded body according to claim 11, wherein the refractive index is 1.640-1.680.

13. The molded body according to claim 11, wherein the Abbe's number is 24 or lower.

14. An optical material that uses the molded body according to claim 11.

15. An optical lens that uses the molded body according to claim 11.

* * * * *